(No Model.)
H. PRIDAY.
GATE.
No. 412,859. Patented Oct. 15, 1889.
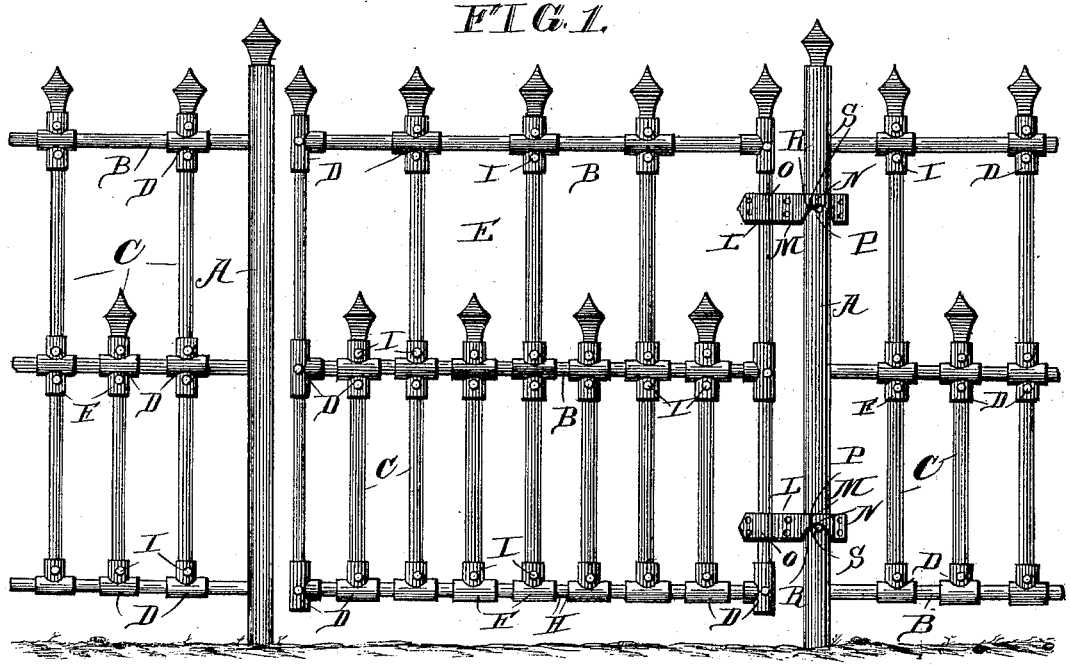
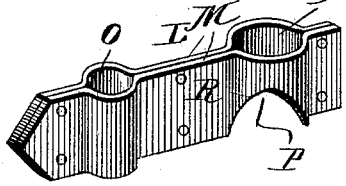
Witnesses
Henry G. Dieterich
J. W. Garner
Inventor
Henry Priday,
By his Attorneys

UNITED STATES PATENT OFFICE.

HENRY PRIDAY, OF HOUSTON, TEXAS.

GATE.

SPECIFICATION forming part of Letters Patent No. 412,859, dated October 15, 1889.

Application filed December 20, 1888. Serial No. 294,190. (No model.)

*To all whom it may concern:*

Be it known that I, HENRY PRIDAY, a citizen of the United States, residing at Houston, in the county of Harris and State of Texas, have invented a new and useful Improvement in Gates, of which the following is a specification.

My invention relates to an improvement in gates; and it consists in the peculiar construction and combination of devices that will be more fully set forth hereinafter, and particularly pointed out in the claim.

The object of the present invention is to provide a hinge of simple and inexpensive construction designed to be employed upon gates and fences constructed of metallic rods or pipes.

In the accompanying drawings, Figure 1 is an elevation of a portion of a fence and a gate embodying my improvements. Fig. 2 is a detailed perspective view of my improved hinge.

A represents a pair of posts made of metallic pipe, and preferably constructed in the manner shown and described in Letters Patent of the United States No. 337,865, granted to me March 16, 1886.

The bars B and pickets C of the fence are of metallic rods or pipes of suitable length, secured together by couplings D, which are composed of two similar sections F. The sides of the sections F are semi-cylindrical, and are adapted to be clamped around the ends of the rods or pipes by bolts I.

L represents the hinges, each of which is composed of a pair of plates M, bolted or riveted together. The said plates are swelled outward in opposite directions at suitable points of their length to provide a cylindrical collar N, to receive and turn upon one of the gate-posts A, and to provide a cylindrical or other suitably-shaped socket O, to receive the bar or pipe at the inner side of the gate.

In opposite sides of each collar N, at the lower edges thereof, are formed inverted-V-shaped openings P, the inclined sides of which form upward-converging cams R.

Pins or bolts S, of suitable length and diameter, are passed transversely through suitable holes in the hinge-post, and the ends thereof project beyond opposite sides of the hinge-post and at right angles to the fence-line and serve to support the hinges, and by acting upon the cam-faces R thereof keep the gate E normally closed by its own gravity, as will be readily understood. When the gate is opened, the inclined cam-faces R of its hinges travel upward on the projecting ends of the pins or bolts R, and thereby serve to elevate the gate slightly. As soon as the latter is released the cam-faces of its hinges and its inherent gravity cause it to swing backward to a closed position, and therefore it is unnecessary to provide the gate with a latch.

Having thus described my invention, I claim—

The post having the projecting pins or studs S, combined with the gate having the hinges L, composed of a pair of plates bolted together, the said plates being swelled outward to provide collars N, which are provided with cams R, as set forth.

In testimony that I claim the foregoing as my own I have hereto affixed my signature in presence of two witnesses.

HENRY PRIDAY.

Witnesses:
EDWIN WILLIAM BROWN,
EDWIN BRUNDRETT.